United States Patent
Chang

(10) Patent No.: US 8,716,970 B2
(45) Date of Patent: *May 6, 2014

(54) METHOD AND CIRCUIT FOR CONTROLLING MOTORS

(75) Inventor: Hsiu-Cheng Chang, Taipei (TW)

(73) Assignee: Sea Sonic Electronics Co., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,786

(22) Filed: Aug. 28, 2012

(65) Prior Publication Data

US 2012/0319635 A1    Dec. 20, 2012

Related U.S. Application Data

(63) Continuation-in-part of application No. 12/400,463, filed on Mar. 9, 2009, now Pat. No. 8,482,236.

(30) Foreign Application Priority Data

Mar. 2, 2009   (TW) ............................... 98106676 A

(51) Int. Cl.
    *G05D 23/00* (2006.01)
(52) U.S. Cl.
    USPC ...... 318/471; 318/445; 361/600; 361/679.01; 361/688; 361/689; 361/690; 361/694; 361/695
(58) Field of Classification Search
    USPC ............ 318/445, 471; 361/600, 679.01, 688, 361/689, 690, 694, 695
    See application file for complete search history.

(56) References Cited

U.S. PATENT DOCUMENTS

| | | | |
|---|---|---|---|
| 4,456,892 A * | 6/1984 | Vandergraaf | 331/176 |
| 5,004,988 A * | 4/1991 | Ueno et al. | 331/116 R |
| 5,687,079 A | 11/1997 | Bauer et al. | |
| 6,617,815 B1 | 9/2003 | Krief | |
| 6,814,546 B2 | 11/2004 | Sekiguchi | |
| 6,933,697 B2 | 8/2005 | Marando et al. | |
| 6,935,130 B2 | 8/2005 | Cheng et al. | |
| 7,075,261 B2 | 7/2006 | Burstein | |
| 7,425,812 B2 | 9/2008 | Goldberg | |
| 7,782,002 B2 | 8/2010 | Cook | |
| 2002/0140389 A1 | 10/2002 | Ohki et al. | |
| 2002/0196606 A1 | 12/2002 | Hirao et al. | |
| 2003/0065426 A1 | 4/2003 | Lino et al. | |
| 2003/0120394 A1 | 6/2003 | Ziarnik | |
| 2003/0202325 A1 | 10/2003 | Sasaki | |
| 2003/0234630 A1 | 12/2003 | Blake | |
| 2005/0047762 A1 | 3/2005 | Liu et al. | |

(Continued)

*Primary Examiner* — Kawing Chan
(74) *Attorney, Agent, or Firm* — Muncy, Geissler, Olds & Lowe, P.C.

(57) ABSTRACT

A method for controlling a motor comprises steps of: first, determining whether a switch of a motor control circuit in an electronic system is in a first state; then, operating the motor at a fanless operation mode when a temperature inside an enclosure of the electronic system is higher than zero and lower than a first threshold temperature, wherein the rotation speed of the motor is zero rpm; operating the motor at a silent operation mode when the temperature is higher than the first threshold temperature and lower than a second threshold temperature, wherein the rotation speed of the motor is a constant rotation speed; and operating the motor at a cooling operation mode when the temperature is higher than the second threshold temperature, wherein the rotation speed of the motor is a function of the temperature and varies between the constant rotation speed and a maximum rotation speed.

8 Claims, 4 Drawing Sheets

(56) References Cited

U.S. PATENT DOCUMENTS

| | | |
|---|---|---|
| 2006/0055350 A1 | 3/2006 | Lin et al. |
| 2006/0109627 A1 | 5/2006 | Lee |
| 2007/0200517 A1* | 8/2007 | Chen .............................. 318/268 |
| 2007/0297893 A1 | 12/2007 | Alon et al. |
| 2008/0042603 A1* | 2/2008 | Chen .............................. 318/109 |
| 2008/0174959 A1 | 7/2008 | Sano et al. |
| 2009/0168333 A1* | 7/2009 | Saito et al. ............... 361/679.48 |

* cited by examiner

METHOD AND CIRCUIT FOR CONTROLLING MOTORS

This application is a continuation-in-part, and claims priority, of from U.S. patent application Ser. No. 12/400,463 filed on Mar. 9, 2009, entitled "METHOD AND CIRCUIT FOR CONTROLLING MOTOR SPEED", the entire contents of which are hereby incorporated by reference.

FIELD OF THE INVENTION

The present invention relates generally to a method and a circuit for controlling a motor, and more particularly to a method and a circuit for controlling rotation speed of a motor, wherein the motor's rotation speed is regulated according to an ambient temperature surrounding the particular exothermic components that is cooled by a cooling fan driven by the controlled motor.

BACKGROUND OF THE INVENTION

Various electronic apparatuses usually have exothermic components that generate heat when the electronic apparatus operates. To cool the exothermic components, fans are often used to evacuate warm air from enclosures in which electronic systems are contained. For example, in personal computers, servers, or the like, the operating frequencies of the CPUs become increasingly higher causing the heat values of the CPUs to increase. Accordingly, computers or similar electronic devices include one or more cooling fans to aid in circulating the air inside the enclosures and for maintaining the ambient temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures. These fans are operated by DC controlled motors. Similarly, in power supplies or the like, the loadings of the power supplies become increasingly higher causing the heat values of the exothermic components to increase. Accordingly, power supplies or similar electronic devices include one or more cooling fans to aid in circulating the air inside the enclosures and for maintaining the ambient temperature inside the enclosures within an acceptable range. The increased airflow provided by fans typically aids in eliminating waste heat that may otherwise build up and adversely affect system operation. Employing cooling fans is especially helpful in ensuring proper operation for components of the power supplies with relatively high operating temperatures. These fans are operated by DC controlled motors. In fact, the cooling fans operated by DC controlled motors can be used in many applications to cool all kinds of exothermic components which require cooling.

For the purpose of conserving electric energy and lowering noise caused by unnecessarily high airflow, the rotation speed of the motor is often expected to be controllable. For instance, the motor is generally required to operate at its full speed when the CPU overheats, while when the CPU is already cooled down or in a stand-by mode, the rotation speed of the motor is expected to be lowered accordingly in order to save energy and reduce annoying noise.

As disclosed in U.S. Pat. No. 7,425,812, control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected ambient temperature. Such control algorithms may also involve lowering the speed of the fan and allowing the fan to continue running at a minimum speed.

As disclosed in U.S. Pat. No. 5,687,079, it suggests controlling the speed of the fan in a computer according to the temperature of the ambient air detected by a thermistor. The current supplied to the motor operating the fan is controlled by a transistor. The base of the transistor is connected to a circuit comprising a thermistor. A low temperature voltage divider provides a constant low voltage to the motor when air temperature is below 28☐. A high temperature voltage divider provides a constant high voltage to the motor when air temperature is above 40☐. Thus, voltage supplied to the motor is constant below 28☐, increases linearly, and is again constant above 40☐. Referring to FIG. 1, as disclosed in U.S. Pat. No. 6,617,815, a perspective view of a curve of the voltage supplied to a motor according to the ambient temperature in the conventional circuit of the prior art is illustrated. As shown in FIG. 1, the vertical axis shows the voltage and the horizontal axis shows the ambient temperature measured at the temperature sensor. Below a lower temperature Tmin, a constant voltage Vmin is supplied to the motor. Above a higher temperature Tmax, a constant voltage Vmax is supplied to the motor. Between Tmin and Tmax, the voltage supplied to the motor is a linear function of the ambient temperature, and varies between Vmin and Vmax.

For a temperature control of the type shown in U.S. Pat. No. 5,687,079, three independent parameters need to be set. The first is the minimal fan speed Umin. The second is the lower temperature Tmin below which the fan will operate at its minimum speed. The third one is the upper temperature Tmax above which the fan will operate at its maximum speed. The prior art circuits do not allow easy control of these three parameters; however, these parameters need to be adapted to the type of computer system in which the fan is used.

Referring to FIG. 2, as disclosed in U.S. Pub. No. 2005/0047762, a perspective view of a curve of the rotation speed of a motor relative to an ambient temperature in the conventional circuit of the prior art is illustrated. As shown in FIG. 2, the vertical axis shows the rotation speed of the motor and the horizontal axis shows the ambient temperature measured at the temperature sensor. When the ambient temperature is lower than a lower temperature Tmin, the motor operates at a lower constant rotation speed Umin. When the ambient temperature is higher than a higher temperature Tmax, the motor operates at a higher constant rotation speed Umax or its full rotation speed. When the ambient temperature is in the range of Tmin to Tmax, the rotation speed of the motor is a linear function of the temperature, and varies between Umin and Umax.

It would thus be desirable to provide a method and a circuit for controlling the motor in order to conserve electric energy and lower noise caused by unnecessarily high airflow such that the power loss and the power efficiency could be improved.

SUMMARY OF THE INVENTION

A main object of the present invention is to provide a method and a circuit for controlling a motor that has three operation modes including a fanless operation mode, a silent operation mode and a cooling operation mode, wherein when the ambient temperature is higher than zero and lower than a first threshold temperature, the motor operates at the fanless operation mode and the rotation speed of the motor is zero rpm.

Another object of the present invention is to provide a method and a circuit for controlling a motor that has three operation modes including a fanless operation mode, a silent operation mode and a cooling operation mode, wherein when the ambient temperature is higher than the first threshold temperature and lower than a second threshold temperature, the motor operates at the silent operation mode and the rotation speed of the motor is a constant rotation speed.

Yet another object of the present invention is to provide a method and a circuit for controlling a motor that has three operation modes including a fanless operation mode, a silent operation mode and a cooling operation mode, wherein when the ambient temperature is higher than the second threshold temperature, the motor operates at the cooling operation mode and the rotation speed of the motor is a linear or curvature function of the temperature.

Accordingly, in order to accomplish the one or some or all above objects, the present invention provides a method for controlling a motor, comprising the steps of:

switching a switch of a motor control circuit in an electronic system to a first state in which temperature detection is activated to control a rotation speed of a motor or a second state in which the temperature detection is stopped to maintain operation of the motor;

determining whether the switch is in the first state to control the rotation speed of the motor;

operating the motor at a first operation mode when a temperature inside an enclosure of the electronic system is higher than zero and lower than a first threshold temperature, wherein the rotation speed of the motor is zero rpm when the motor operates at the first operation mode;

operating the motor at a second operation mode when the temperature is higher than the first threshold temperature and lower than a second threshold temperature, wherein the rotation speed of the motor is a constant rotation speed when the motor operates at the second operation mode; and operating the motor at a third operation mode when the temperature is higher than the second threshold temperature, wherein the rotation speed of the motor is a function of the temperature and varies between the constant rotation speed and a maximum rotation speed when the motor operates at the third operation mode;

wherein the motor changes from the zero speed to the constant rotation speed or vice versa at the same first threshold temperature regardless of whether the temperature is increasing or decreasing.

Moreover, to achieve the one or some or all above objects, the present invention also provides a motor control circuit which is installed inside an enclosure of an electronic system to detect temperature in the enclosure to determine rotation speed of a motor. The motor control circuit has a switch including a first state in which the temperature detection is activated to control the rotation speed of the motor and a second state in which the temperature detection is stopped to maintain operation of the motor. The motor control circuit further includes a first threshold temperature and a second threshold temperature to define three operation modes thereof. When the temperature in the enclosure is higher than zero and lower than the first threshold temperature, the motor control circuit operates at a first operation mode to allow the rotation speed of the motor to be zero rpm. When the temperature in the enclosure is higher than the first threshold temperature and lower than the second threshold temperature, the motor control circuit operates at a second operation mode to allow the motor to operate at a constant rotation speed. When the temperature in the enclosure is higher than the second threshold temperature, the motor control circuit operates at a third operation mode to allow the rotation speed of the motor to be a function of the temperature that varies between the constant rotation speed and a maximum rotation speed.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
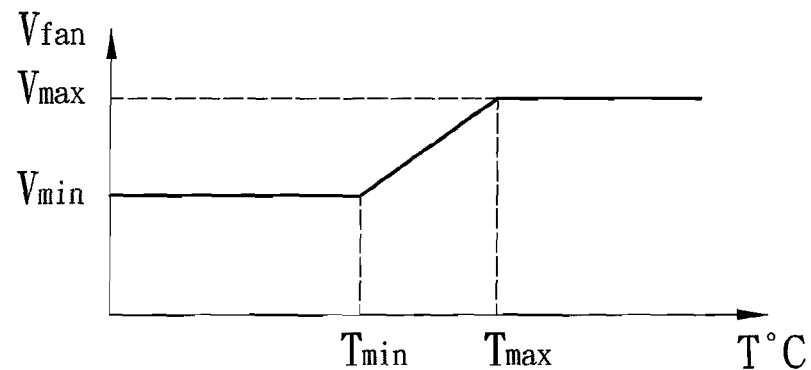
FIG. 1 shows a perspective view of a curve of the voltage supplied to a motor according to the temperature in the conventional circuit of the prior art.
Figure 2:
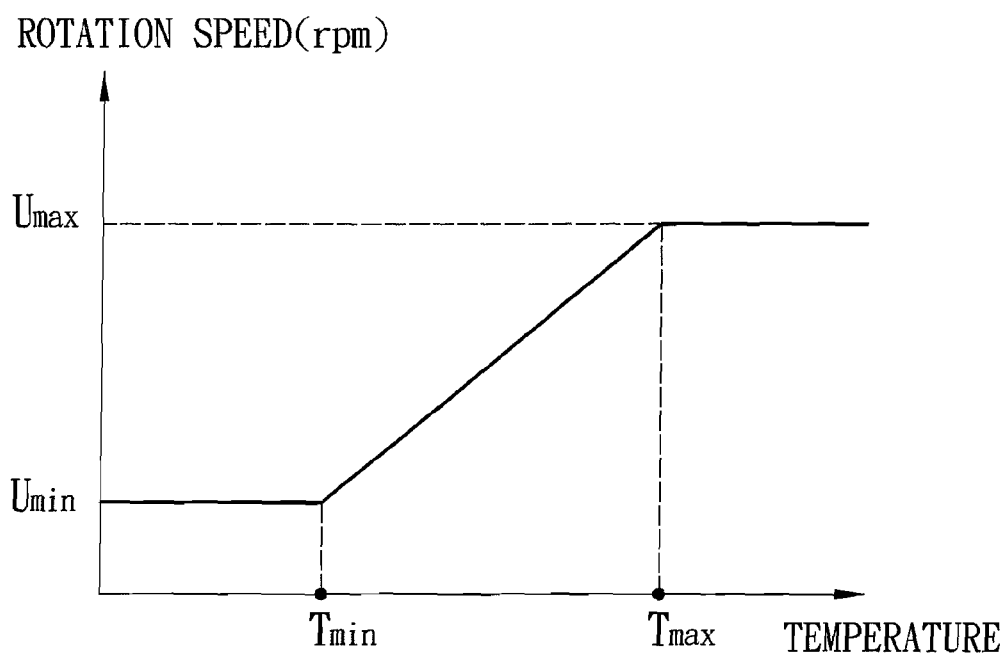
FIG. 2 shows a perspective view of a curve of the rotation speed of a motor relative to an ambient temperature in the conventional circuit of the prior art.
Figure 3A:
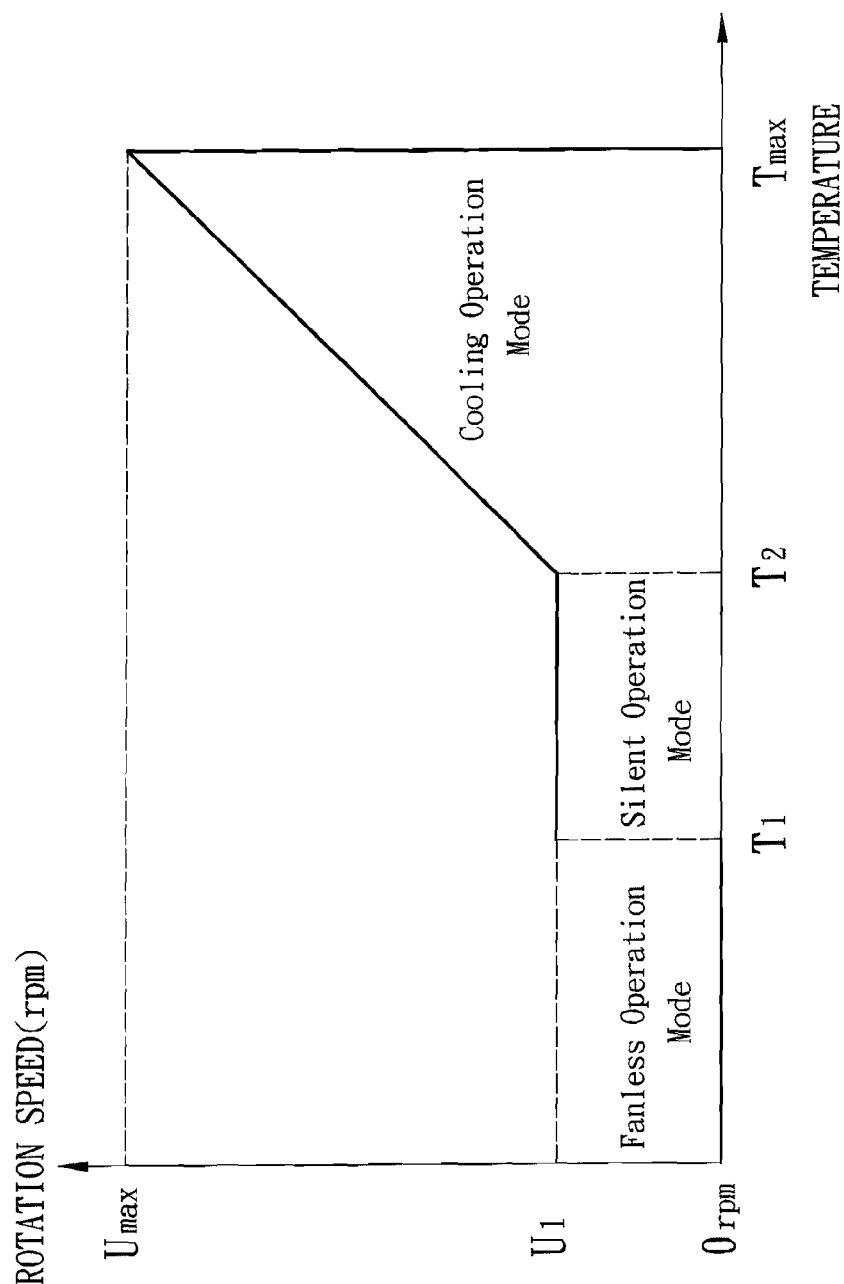
FIG. 3A shows a perspective view of a motor's rotation speed relative to a temperature inside the enclosure of the electronic system according to a first preferred embodiment of the present invention.

Referring to FIG. 3A, a perspective view of a curve of the rotation speed of a motor relative to an ambient temperature inside the enclosure of the electronic system according to a first preferred embodiment of the present invention is illustrated. As shown in FIG. 3A, the vertical axis shows the rotation speed of the motor and the horizontal axis shows the ambient temperature measured by a temperature sensor. In this preferred embodiment, the motor is controlled at three operation modes when operating in different rotation speeds that include a fanless operation mode (i.e. a first operation mode), a silent operation mode (i.e. a second operation mode) and a cooling operation mode (i.e. a third operation mode). When the ambient temperature inside the enclosure of the electronic system is higher than zero and lower than a first threshold temperature T1, the motor operates at the fanless operation mode. When the motor operates at the fanless operation mode, the rotation speed of the motor is zero rpm. When the ambient temperature inside the enclosure of the electronic system is higher than the first threshold temperature T1 and lower than a second threshold temperature T2, the motor operates at the silent operation mode. When the motor operates at the silent operation mode, the motor operates at a low constant rotation speed U1, i.e. the minimum rotation speed of the motor. When the ambient temperature inside the enclosure of the electronic system is higher than the second threshold temperature T2, the motor operates at the cooling operation mode. The rotation speed of the motor is a linear function of the ambient temperature in the enclosure and varies between the low constant rotation speed U1 and the maximum rotation speed Umax. The maximum rotation speed Umax could be the full rotation speed of the motor. In other words, when the ambient temperature inside the enclosure of the electronic system is in the range of T2 to Tmax, the rotation speed of the motor increases linearly with the increase of the ambient temperature inside the enclosure of the electronic system. More specifically, the motor changes from the zero speed to the constant rotation speed or vice versa at the same first threshold temperature regardless of whether the temperature is increasing or decreasing.

Figure 3B:
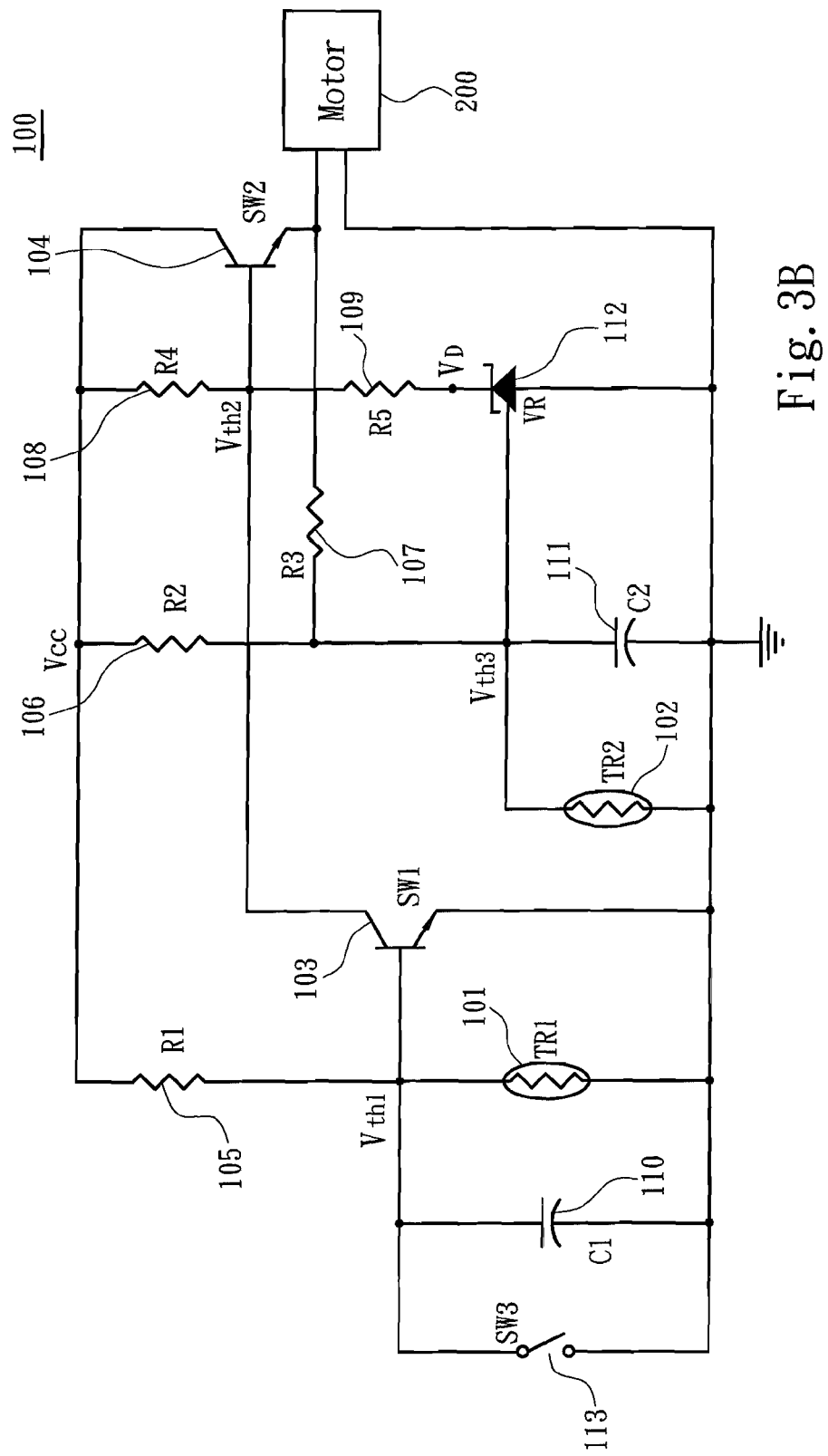
FIG. 3B shows a perspective view of a motor control circuit according to the first preferred embodiment of the present invention.

Referring to FIG. 3B, a perspective view of a motor control circuit according to the first preferred embodiment of the present invention is illustrated. FIG. 3A shows a possible implementation of the curve of the rotation speed of the motor relative to the ambient temperature. As shown in FIG. 3B, the motor control circuit 100, which is applied to control the rotation speed of a motor 200, includes thermistors TR1 referenced 101 and TR2 referenced 102, transistors SW1 referenced 103 and SW2 referenced 104, resistors R1 referenced 105, R2 referenced 106, R3 referenced 107, R4 referenced 108 and R5 referenced 109, capacitors C1 referenced 110 and C2 referenced 111, a reference regulator VR referenced 112, and a switch SW3 referenced 113. The thermistors 101 and 102 are utilized as temperature sensors which have resistances that vary from 100 ohms to 30 megohms at room temperature 25☐ as currently manufactured. Generally speaking, high resistances above 100 k ohms are used for high temperatures, for example from 150☐ to 315☐, while intermediate resistances from 2 k ohms to 75 k ohms are used at intermediate temperatures of 66☐ to 150☐, and low resistances 100 ohms to 1 k ohms are used for low temperatures from −73☐ to 66☐. Preferably, the temperature sensors are installed in the middle of the enclosure, where the temperature is representative of the ambient temperature of different components inside the computer, server, power supply, or the like.

The thermistor 101 is connected in series with the resistor 105 between a voltage Vcc and a ground. The voltage Vcc is generally 12 volts provided in usual computer systems or power supply systems. The thermistor 102 is also connected in series with the resistor 106 between the voltage Vcc and the ground. According to one feature of the invention, the capacitor 110 with a capacitance C1 is connected in parallel with the thermistor 101 to reduce noise. The base of the transistor 103 is connected between the resistor 105 and the thermistor 101. The emitter of the transistor 103 is grounded and the collector of the transistor 103 is connected to the base of the transistor 104. The base of the transistor 104 is connected between the resistor 108 and the resistor 109. A series circuit includes the resistor 108, the resistor 109, and the reference regulator 112 connected between the voltage Vcc and the ground. The anode terminal of the reference regulator 112 is grounded and the cathode terminal of the reference regulator 112 is connected in series with the resistor 109. The reference terminal of the reference regulator 112 is connected between the resistor 106 and the thermistor 102. The capacitor 111 is connected in parallel with the thermistor 102. The motor 200 is connected between the ground and the emitter of the transistor 104, while the collector of the transistor 104 is connected to the voltage Vcc. The resistor 107 is connected between the emitter of the transistor 104 and the node between the resistor 106 and the thermistor 102. Thus, the voltage Vcc applied to the motor 200 is controlled by the transistor 104 according to the conduction state of the transistor 103. The switch 113 is connected in parallel with the capacitor 110 and the thermistor 101. The switch 113 can be switched between a first state and a second state. When the switch 113 is set off, it is in the first state; when the switch 113 is set on, it is in the second state. When the switch 113 is in the first state, the thermistor 101 is not affected by the OFF condition of the switch 113 since they are connected in parallel. That is to say the rotation speed of the motor 200 can be still determined by the detection of the thermistor 101. In the event that the switch 113 is in the second state, the switch 113 is set on to make the thermistor 101 stop detecting the temperature in the enclosure, so that the motor 200 operates continuously.

When the motor control circuit operates at the fanless operation mode, i.e. the ambient temperature in the enclosure is higher than zero but lower than the first threshold temperature T1, such as 50☐, the resistance of the thermistor 101 has to be sufficiently high to allow a divided voltage Vth1 produced by the division circuit consisting of the thermistor 101 and the resistor 105 to apply to the base of the transistor 103 and set on the transistor 103 due to the characteristic of the thermistor 101 that its resistance varies with the temperature. Accordingly, the transistor 104 is set off to stop the DC voltage Vcc supplying to the motor 200, so as to stop the motor 200. Therefore, under the fanless operation mode, electric energy can be saved and noise caused by unnecessary airflow also can be avoided to improve power loss and power efficiency.

When the motor control circuit operates at the silent operation mode, i.e. the ambient temperature in the enclosure is higher than the first threshold temperature T1 such as 50☐ but lower than the second threshold temperature T2 such as 80☐, the resistance of the thermistor 101 has to be sufficiently low to allow the divided voltage Vth1 produced by the division circuit consisting of the thermistor 101 and the resistor 105 to apply to the base of the transistor 103 and set off the transistor 103 due to the characteristic of the thermistor 101 that its resistance varies with the temperature.

Furthermore, when the motor control circuit operates at the silent operation mode, i.e. the ambient temperature in the enclosure is higher than the first threshold temperature T1 such as 50° C. but lower than the second threshold temperature T2 such as 80° C., because the resistance of the thermistor 102 decreases with the increase of the temperature, a divided voltage Vth3 produced by the division circuit consisting of the thermistor 102 and the resistor 106 is also decreased and applied to the reference terminal of the reference regulator 112, wherein the divided voltage Vth3 is set to be higher than the reference input voltage Vref of the reference regulator 112, so as to maintain an output voltage VD of the reference regulator 112 at a first low voltage level, such as the reference input voltage Vref. The reference regulator 112 may be a shunt regulator, such as TL431, that is well-known to those skilled in the art. The value of the divided voltage Vth3 is determined by the resistances of the thermistor 102 and the resistor 106. The resistance of the resistor 106 has to be set at an appropriate value to let the divided voltage Vth3 higher than the reference input voltage Vref of the reference regulator 112 so as to maintain the voltage VD at the first low voltage level. Accordingly, another divided voltage Vth2 produced by the division of the DC voltage Vcc via the resistors 108 and 109 and the reference regulator 112 is maintained at a second low voltage level and applied to the transistor 104, so as to drive the motor 200 at a low constant rotation speed U1. Therefore, under the silent operation mode, noise caused by unnecessary high airflow can be reduced and power loss and power efficiency also can be improved.

When the motor control circuit operates at the cooing operation mode, i.e. the ambient temperature in the enclosure is higher than the second threshold temperature T2 such as 80☐, the resistance of the thermistor 101 has to be sufficiently low to allow the divided voltage Vth1 produced by the division circuit consisting of the thermistor 101 and the resistor 105 to apply to the base of the transistor 103 and set off the transistor 103 due to the characteristic of the thermistor 101 that its resistance varies with the temperature.

Furthermore, when the motor control circuit operates at the cooling operation mode, i.e. the ambient temperature in the enclosure is higher than the second threshold temperature T2 such as 80° C., because the resistance of the thermistor 102 decreases with the increase of the temperature, a divided voltage Vth3 produced by the division circuit consisting of the thermistor 102 and the resistor 106 is also decreased and applied to the reference regulator 112, wherein the divided voltage Vth3 is set to be lower than the reference input voltage Vref of the reference regulator 112, so as to linearly increase the voltage VD with the increase of the temperature. Accordingly, another divided voltage Vth2 produced by the division of the DC voltage Vcc via the resistors 108 and 109 and the reference regulator 112 is linearly increased with the increase of the temperature and applied to the transistor 104, so as to linearly increase the rotation speed of the motor 200 with the increase of the ambient temperature. The slope ratio of dU/dT may be determined and adjusted by the resistance R3 of the resistor 107. Therefore, under the cooling operation mode, the rotation speed of the motor 200 can be linearly increased with the increase of the ambient temperature such that the system can operate normally at high temperatures.

Before the motor 200 is controlled, the switch 113 has to be switched to the first state in which the temperature detection is activated to control the rotation speed of the motor 200 or the second state in which the temperature detection is stopped to maintain operation of the motor 200 first. Then it is to determine whether the switch 113 is in the first state or the second state. In the event that the switch 113 is in the first state, the thermistor 101 can detect the temperature in the enclosure of the electronic system to determine the motor 200 to operate at the fanless operation mode, the silent operation mode or the cooling operation mode, thus controlling the rotation speed of the motor 200. However, in the event that the switch 113 is in the second state, the thermistor 101 cannot detect the temperature in the enclosure while the motor 200 operates continuously.

Figure 3C:
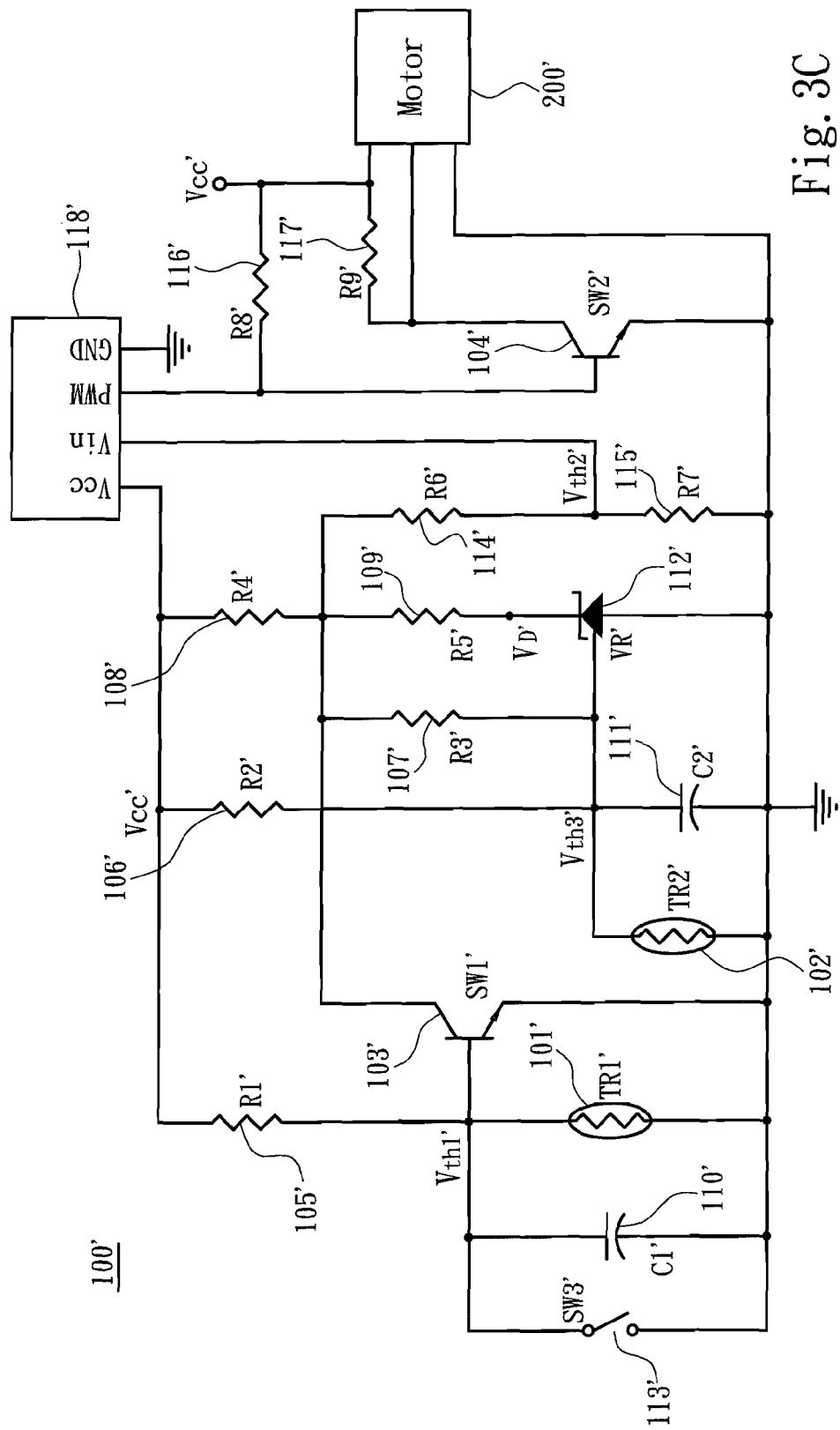
FIG. 3C shows a perspective view of another motor control circuit according to the first preferred embodiment of the present invention.

Referring to FIG. 3C, a perspective view of another motor control circuit according to the first preferred embodiment of the present invention is illustrated. FIG. 3A shows a possible implementation of the curve of the rotation speed of the motor relative to the ambient temperature. As shown in FIG. 3C, the motor control circuit 100' is applied to control the rotation speed of a motor 200'. The motor control circuit 100' includes thermistors TR1' referenced 101' and TR2' referenced 102', transistors SW1' referenced 103' and SW2' referenced 104', a switch SW3' referenced 113', resistors R1' referenced 105', R2' referenced 106', R3' referenced 107', R4' referenced 108', R5' referenced 109', R6' referenced 114', R7' referenced 115', R8' referenced 116' and R9' referenced 117', capacitors C1' referenced 110' and C2' referenced 111', a reference regulator VR' referenced 112', and a PWM IC 118'. The thermistors 101' and 102' are utilized as temperature sensors. Preferably, the temperature sensors are located in the middle of the enclosure, where the temperature is representative of the temperature of different components inside the computer, server, power supply, or the like.

The thermistor 101' is connected in series with the resistor 105' between a voltage Vcc' and a ground. The voltage Vcc' is 12 volts provided in usual computer systems or power supply systems. The thermistor 102' is also connected in series with the resistor 106' between a voltage Vcc' and the ground. According to one feature of the invention, the capacitor 110' with a capacitance C1' is connected in parallel with the thermistor 101' to reduce noise. The base of the transistor 103' is connected between the resistor 105' and the thermistor 101'. The emitter of the transistor 103' is grounded. A series circuit includes the resistor 108', the resistor 109', and the reference regulator 112' connected between the voltage Vcc' and the ground. The anode terminal of the reference regulator 112' is grounded and the cathode terminal of the reference regulator 112' is connected in series with the resistor 109'. The reference terminal of the reference regulator 112' is connected between the resistor 106' and the thermistor 102'. The capacitor 111' is connected in parallel with the thermistor 102'. The collector of the transistor 103' is connected to the node between the resistor 108' and the resistor 109'. The resistor 107' is connected between the reference terminal of the reference regulator 112' and the node between the resistor 108' and the resistor 109'. A series circuit further includes the resistor 114' and the resistor 115' connected between the collector of the transistor 103' and the ground. The PWM IC 118' has four terminals Vcc, Vin, PWM and GND. The terminal Vcc of the PWM IC 118' is connected to the voltage Vcc'. The terminal Vin of the PWM IC 118' is connected to the node between the resistor 114' and the resistor 115'. The terminal GND of the PWM IC 118' is grounded. The base of the transistor 104' is connected to one terminal of the resistor 116' and the terminal PWM of the PWM IC 118'. The other terminal of the resistor 116' is connected to the voltage Vcc' and one terminal of the resistor 117' which is connected to the motor 200'. The emitter of the transistor 104' is grounded. The motor 200' is connected between the ground and the collector of the transistor 104' through the resistor 117'. Thus, the voltage Vcc' applied to the motor 200' is controlled by the transistor 104' according to the conduction state of the transistor 103'.

The switch 113' is connected in parallel with the capacitor 110' and the thermistor 101'. The switch 113' can be switched between a first state and a second state. When the switch 113' is set off, it is in the first state; when the switch 113' is set on, it is in the second state. When the switch 113' is in the first state, the thermistor 101' is not affected by the OFF condition of the switch 113' since they are connected in parallel. That is to say the rotation speed of the motor 200' can be still determined by the detection of the thermistor 101'. In the event that the switch 113' is in the second state, the switch 113' is set on to make the thermistor 101' stop detecting the temperature in the enclosure, so that the motor 200' operates continuously.

Before the motor 200' is controlled, the switch 113' has to be switched to the first state in which the temperature detection is activated to control the rotation speed of the motor 200' or the second state in which the temperature detection is stopped to maintain operation of the motor 200' first. Then it is to determine whether the switch 113' is in the first state or the second state. In the event that the switch 113' is in the first state, the thermistor 101' can detect the temperature in the enclosure of the electronic system to determine the motor 200' to operate at the fanless operation mode, the silent operation mode or the cooling operation mode, thus controlling the rotation speed of the motor 200'. However, in the event that the switch 113' is in the second state, the thermistor 101' cannot detect the temperature in the enclosure while the motor 200' operates continuously.

When the motor control circuit operates at the fanless operation mode, i.e. the ambient temperature in the enclosure is higher than zero but lower than the first threshold temperature T1, such as 50° C., the resistance of the thermistor 101' has to be sufficiently high to allow a divided voltage Vth1' produced by the division circuit consisting of the thermistor 101' and the resistor 105' to apply to the base of the transistor 103' and set on the transistor 103' due to the characteristic of the thermistor 101' that its resistance varies with the temperature. Accordingly, the input voltage of the terminal Vin is set to be lower than a first threshold voltage, such as 0.8 volts, and then the transistor 104' is set off to stop the DC voltage Vcc' supplying to the motor 200', so as to stop the motor 200'. Therefore, under the fanless operation mode, electric energy can be saved and noise caused by unnecessary airflow also can be avoided to improve power loss and power efficiency.

When the motor control circuit operates at the silent operation mode, i.e. the ambient temperature in the enclosure is higher than the first threshold temperature T1 such as 50° C. but lower than the second threshold temperature T2 such as 80° C., the resistance of the thermistor 101' has to be sufficiently low to allow the divided voltage Vth1' produced by the division circuit consisting of the thermistor 101' and the resistor 105' to apply to the base of the transistor 103' and set off the transistor 103' due to the characteristic of the thermistor 101' that its resistance varies with the temperature.

Furthermore, when the motor control circuit operates at the silent operation mode, i.e. the ambient temperature in the enclosure is higher than the first threshold temperature T1 such as 50° C. but lower than the second threshold temperature T2 such as 80° C., because the resistance of the thermistor 102' decreases with the increase of the temperature, a divided voltage Vth3' produced by the division circuit consisting of the thermistor 102' and the resistor 106' is also decreased and applied to the reference regulator 112', wherein the divided voltage Vth3' is set to be higher than the reference input voltage Vref of the reference regulator 112', so as to maintain an output voltage VD' of the reference regulator 112' at a first low voltage level. The reference regulator 112' may be a shunt regulator, such as TL431, that is well-known to those skilled in the art. The value of the divided voltage Vth3' is determined by the resistances of the thermistor 102' and the resistor 106'. The resistance of the resistor 106' has to be set at an appropriate value to let the divided voltage Vth3' higher than the reference input voltage Vref of the reference regulator 112' so as to maintain the voltage VD' at the first low voltage level. Accordingly, another divided voltage Vth2' produced by the division of the DC voltage Vcc' via the resistors 108', 109', 114' and 115' and the reference regulator 112' is maintained at a second low voltage level such as 1.8 volts and applied to the terminal Vin of the PWM IC 118', such that the terminal PWM of the PWM IC 118' can output a PWM signal having 50% duty cycle, so as to drive the motor 200' at a low constant rotation speed U1. Therefore, under the silent operation mode, noise caused by unnecessary high airflow can be reduced and power loss and power efficiency also can be improved.

When the motor control circuit operates at the cooing operation mode, i.e. the ambient temperature in the enclosure is higher than the second threshold temperature T2 such as 80° C., the resistance of the thermistor 101' has to be sufficiently low to allow the divided voltage Vth1' produced by the division circuit consisting of the thermistor 101' and the resistor 105' to apply to the base of the transistor 103' and set off the transistor 103' due to the characteristic of the thermistor 101' that its resistance varies with the temperature.

Furthermore, when the motor control circuit operates at the cooling operation mode, i.e. the ambient temperature in the enclosure is higher than the second threshold temperature T2 such as 80° C., because the resistance of the thermistor 102' decreases with the increase of the temperature, a divided voltage Vth3' produced by the division circuit consisting of the thermistor 102' and the resistor 106' is also decreased and applied to the reference regulator 112', wherein the divided voltage Vth3' is set to be lower than the reference input voltage Vref of the reference regulator 112', so as to linearly increase the voltage VD' with the increase of the temperature. Accordingly, another divided voltage Vth2' produced by the division of the DC voltage Vcc' via the resistors 108', 109', 114' and 115' and the reference regulator 112' is linearly increased with the increase of the temperature and applied to the terminal Vin of the PWM IC 118', such that the terminal PWM of the PWM IC 118' can output a PWM signal having a duty cycle from 50% to 100%, so as to drive the motor 200' from a rotation speed U1 to another rotation speed Umax. Thus, the rotation speed of the motor 200' is linearly increased with the increase of the ambient temperature. The slope ratio of dU/dT may be determined and adjusted by the resistance R3' of the resistor 107'. Therefore, under the cooling operation mode, the rotation speed of the motor 200' can be linearly increased with the increase of the ambient temperature such that the system can operate normally at high temperatures.

Consequently, the present invention provides a method for controlling a motor by determining whether the switch of the motor control circuit is in the first state before the motor is controlled, and then detecting the temperature in the enclosure of the electronic system to control the rotation speed of the motor. The method for controlling the motor has three operation modes including a fanless operation mode, a silent operation mode, and a cooling operation mode. When the ambient temperature is higher than zero but lower than a lower temperature, the motor operates at the fanless operation mode, and the rotation speed of the motor is zero rpm. When the ambient temperature is higher than the lower temperature but lower than a higher temperature, the motor operates at the silent operation mode, and the rotation speed of the motor is a constant rotation speed. When the ambient temperature is higher than the higher temperature, the motor operates at the cooling operation mode, and the rotation speed of the motor is a linear or curvature function of the temperature. Therefore, under the fanless operation mode, electric energy can be saved and noise caused by unnecessary airflow also can be avoided to improve power loss and power efficiency. Moreover, under the silent operation mode, noise caused by unnecessary high airflow can be reduced and power loss and power efficiency also can be improved.

One skilled in the art will understand that the embodiment of the present invention as shown in the drawings and described above is exemplary only and not intended to be limited.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for controlling a motor, comprising the steps of:
    providing a motor control circuit in an enclosure in which an electronic system is contained to control rotation speed of a motor, wherein the motor control circuit includes a first thermistor and a second thermistor for detecting a temperature inside the enclosure, a first resistor connected in series with the first thermistor, a first node between the first thermistor and the first resistor, a second resistor connected in series with the second thermistor, a second node between the second thermistor and the second resistor, a switch connected in parallel with the first thermistor, a first transistor with a base connected to the first node and a collector connected to a third node, a second transistor with a base connected to the third node and an emitter connected to the motor, and a reference regulator connected with the second node and the third node and having a reference input voltage;
    switching the switch of the motor control circuit to a first state in which temperature detection is activated to control the rotation speed of the motor or a second state in which the temperature detection is stopped to maintain operation of the motor;
    determining whether the switch is in the first state to control the rotation speed of the motor;
    operating the motor at a first operation mode when the temperature inside the enclosure is higher than zero and lower than a first threshold temperature, wherein in the first operation mode, the first thermistor has a first resistance to allow voltage of the first node to be changed to turn on the first transistor while the second transistor is turned off so that the rotation speed of the motor is zero rpm;
    operating the motor at a second operation mode when the temperature is higher than the first threshold temperature and lower than a second threshold temperature, wherein in the second operation mode, the first thermistor has a second resistance smaller than the first resistance to allow the first transistor to be turned off while voltage of the second node is changed by the second thermistor to be greater than the reference input voltage of the reference regulator to turn on the second transistor so that the motor operates at a constant rotation speed; and
    operating the motor at a third operation mode when the temperature is higher than the second threshold temperature, wherein in the third operation mode, the first thermistor has a third resistance smaller than the second resistance to allow the first transistor to be turned off while the voltage of the second node is changed by the second thermistor to be smaller than the reference input voltage of the reference regulator to turn on the second transistor so that the rotation speed of the motor is a function of the temperature and varies between the constant rotation speed and a maximum rotation speed;
    wherein the motor changes from the zero speed to the constant rotation speed or vice versa at the same first threshold temperature regardless of whether the temperature is increasing or decreasing.

2. The method of claim 1, wherein the temperature is representative of the temperature of different components inside one of computer, server and power supply.

3. The method of claim 2, wherein the first operation mode is a fanless operation mode, the second operation mode is a silent operation mode, and the third operation mode is cooling operation mode.

4. The method of claim 1, wherein the first operation mode is a fanless operation mode, the second operation mode is a silent operation mode, and the third operation mode is cooling operation mode.

5. The method of claim 4, wherein the rotation speed of the motor is a linear function of the temperature and varies between the constant rotation speed and the maximum rotation speed when the motor operates at the cooling operation mode.

6. The method of claim 5, wherein the maximum rotation speed is a full rotation speed of the motor.

7. The method of claim 1, wherein the rotation speed of the motor increases linearly with the increase of the temperature when the temperature is in the range of the second threshold temperature to a maximum temperature, wherein the maximum temperature is corresponding to the maximum rotation speed of the motor.

8. A motor control circuit, installed inside an enclosure of an electronic system to detect temperature in the enclosure to determine rotation speed of a motor, comprising:
    a first thermistor and a second thermistor for detecting the temperature inside the enclosure;
    a first resistor connected in series with the first thermistor;
    a first node between the first thermistor and the first resistor;
    a second resistor connected in series with the second thermistor;
    a second node between the second thermistor and the second resistor;
    a switch connected in parallel with the first thermistor;
    a first transistor including a base connected to the first node and a collector connected to a third node;
    a second transistor including a base connected to the third node and an emitter connected to the motor; and
    a reference regulator which is connected with the second node and the third node and has a reference input voltage;
    wherein the switch includes a first state in which the temperature detection is activated to control the rotation speed of the motor and a second state in which the temperature detection is stopped to maintain operation of the motor;
    wherein the motor control circuit includes a first threshold temperature and a second threshold temperature when the switch is in the first state to define three operation modes thereof;

wherein the motor control circuit operates at a first operation mode to allow the rotation speed of the motor to be zero rpm when the temperature in the enclosure is higher than zero and lower than the first threshold temperature;

wherein the motor control circuit operates at a second operation mode to allow the motor to operate at a constant rotation speed when the temperature in the enclosure is higher than the first threshold temperature and lower than the second threshold temperature;

wherein the motor control circuit operates at a third operation mode to allow the rotation speed of the motor to be a function of the temperature that varies between the constant rotation speed and a maximum rotation speed when the temperature in the enclosure is higher than the second threshold temperature; and wherein the motor changes from the zero speed to the constant rotation speed or vice versa at the same first threshold temperature regardless of whether the temperature is increasing or decreasing.

* * * * *